United States Patent [19]

Kimura et al.

[11] Patent Number: 4,945,335

[45] Date of Patent: Jul. 31, 1990

[54] ELECTRONIC UNIT OPERABLE IN CONJUNCTION WITH BODY UNIT

[75] Inventors: Toshiyuki Kimura; Youichi Yamazaki; Yoshiya Nonaka; Yasunao Go; Fumio Endo; Hiroyuki Komata; Mitsuo Syoji, all of Kawagoe, Japan

[73] Assignee: Pioneer Electronic Corporation, Tokyo, Japan

[21] Appl. No.: 353,420

[22] Filed: May 18, 1989

[30] Foreign Application Priority Data

Oct. 6, 1988 [JP] Japan ................................ 63-250795

[51] Int. Cl.[5] ......................... B60R 25/10; H04B 1/06

[52] U.S. Cl. .................................... 340/426; 340/687; 340/693; 307/10.2; 455/346; 455/348; 455/351; 364/708; 361/331; 439/297

[58] Field of Search ............... 340/426, 568, 572, 686, 340/687, 693; 307/10.1, 9.1, 10.2; 455/95, 99, 345-351; 379/447; 361/331, 380, 390, 391; 364/708, 705.01, 705.05, 709.1, 709.05; 439/296, 297

[56] References Cited

U.S. PATENT DOCUMENTS 4,668,873 5/1987 Ohba et al. ........................... 307/9.1

4,758,817 7/1988 Akiyama ............................. 455/346

4,805,233 2/1989 Robitschko et al. ................ 455/346

*Primary Examiner*—Donnie L. Crosland

*Attorney, Agent, or Firm*—Sughrue, Mion, Zinn, Macpeak & Seas

[57] ABSTRACT

An electronic unit operable in conjunction with a body unit and used by mounting it on an automotive vehicle. The electronic unit includes first and second connectors which produces a coupled-status signal when the electronic unit is coupled to the body unit and a decoupled-status signal when the electronic unit is decoupled from the body unit. A microcomputer is coupled to the first connector and is selectively placed to a start mode when the coupled-status signal is received from the first connector and to a stop mode when the decoupled-status signal is received therefrom. The microcomputer produces clock pulses when it is in the start mode and a stop signal when it is in the stop mode. A timer is coupled to the microcomputer and outputs a reset signal to the microcomputer when the clock pulses are not received for more than a predetermined period of time. The timer further inhibits the reset signal from being outputted when the stop signal is received. In the electronic unit thus arranged, resetting of the microcomputer is ensured should the same be in a runaway condition.

4 Claims, 2 Drawing Sheets

ELECTRONIC UNIT OPERABLE IN CONJUNCTION WITH BODY UNIT

BACKGROUND OF THE INVENTION

The present invention relates to an electronic unit operable in conjunction with a body unit, in which the body unit is fixedly mounted on an automotive vehicle and an electronic unit is detachably coupled to the body unit.

Recent audio or video equipments mounted on automotive vehicles are provided with an anti-theft function, so that such equipments illegally detached from an automobile are rendered invalid when used in another automobile. Or, to prevent an electronic equipment from being stolen, the equipment is detachably mounted on the vehicle so that the owner of the equipment can carry it out when he leaves his car. When such an electronic unit is used in his own car, the electronic unit is coupled to a body unit which has been fixedly mounted on the car. The electronic unit and the body unit is thus electrically connected to each other, thereby allowing the electronic unit to operate.

The body unit 1 is fixedly mounted on an automotive vehicle and as shown in FIG. 3, it has upper, lower and side walls defining a space for receiving the electronic unit 2. Two locking holes 1*a*, 1*b* (or 1*c*, 1*d*) are formed at the fore ends of each side plate for locking engagement with the associated locking projections provided in a tape deck or an electronic unit 2. When the tape deck 2 is operated, it is inserted into the space of the body unit 1 as indicated by an arrow to bring the locking projections into engagement with the locking holes formed in the body unit 1.

The term "electronic unit" used throughout the specification generally covers audio and video equipments, including, for example, radio receivers, such as AM/FM receivers, cassette decks, DAD players, such as CD (Compact Disk) players or TV or video sets. It should be noted, however, that the term "electronic unit" is not specifically limited to those mentioned above, but they are defined to mean electronic apparatus or equipments which achieve prescribed functions or operations when accommodated into the body unit and supplied with electric power.

In FIG. 1, there is shown a block diagram illustrating a conventional electronic unit of the type mentioned above.

In FIG. 1 a body unit 1 is installed in an automotive vehicle. The electronic unit 2 is detachably coupled to the body unit 1. The electronic unit 2 includes a connector 3, a CPU 4, and a timer 5. When the electronic unit 2 is coupled to the body unit 1, an enable signal or a coupled-status signal is supplied to the electronic unit 2 through the connector 3, whereas when the electronic unit 2 is decoupled from the body unit 1, a disable signal or a decoupled-status signal is supplied thereto through the connector 3. When the coupled-status signal is supplied to the terminal CH of the CPU 4 through the connector 3, the CPU 4 is placed in a start mode whereat clock pulses are issued from a terminal TG of the CPU 4 and a start signal is issued from a terminal IH thereof. When, on the other hand, the decoupled-status signal is supplied to the terminal CH of the CPU 4 from the connector 3, the CPU 4 is placed in a stop mode whereat the issuance of the clock pulses from the terminal TG is halted and a stop signal is issued from the terminal IH. The CPU 4 is reset in response to a reset signal supplied to its reset (R) terminal. The terminal IN of the timer 5 is supplied with the clock pulses from the CPU 4 and the reset signal for resetting the CPU 4 is issued from a terminal OUT of the timer 5 when the clock pulses are not received for more than a predetermined period of time. The reset signal is not outputted from the terminal OUT when the stop signal is received at the terminal CN.

Although not indicated in the figure, a large quantity capacitor or a secondary battery is provided in the electronic unit 2 for supplying electric power to both the CPU 4 and the timer 5 when the CPU 4 is placed in the stop mode.

Next, operation will be described.

When the electronic unit 2 is coupled to the body unit 1, the electronic unit 2 is powered by the body unit 1 and is allowed to perform prescribed operations responsive to the coupled-status signal supplied from the body unit 1 to the terminal CH through the connector 3. When the electronic unit 2 is decoupled from the body unit 1, the decoupled-status signal is supplied to the terminal CH of the CPU 4 and the CPU 4 in turn terminal IH to the terminal CN of the timer 5, whereupon the CPU 4 is placed in the stop mode. Hence, the clock pulses are no longer issued from the terminal TG. When the stop signal is supplied to the terminal CN of the timer 5, the latter stops its operation and is also placed in the stop mode. In the stop mode of the timer 5, the reset signal is not issued from the terminal OUT. Therefore, the CPU 4 which has been placed in the stop mode is never reset to the initial condition. In the stop mode, the CPU 4 holds the contents of a memory (not shown) with a little amount of power consumption.

The electronic unit 2 is provided with a release function to protect the electronic unit 2 from run-away condition of the CPU 4 occuring for some reasons. To this end, the timer 5 is designed to be reset whenever the timer 5 is supplied with clock pulses of a given period T from the terminal TG of the CPU 4. After elapse of a predetermined period of time t upon resetting the timer 5, the timer 5 outputs the reset signal from its terminal OUT. However, if the timer 5 is again reset by the subsequent clock pulse before expiration of the predetermined period of time t, the timer 5 does not output the reset signal to the CPU 4 so that if the relationship between the period T and the period of time t is set to $T<5$, the timer 5 never outputs the reset signal during the normal generation of the clock pulses from the CPU 4.

If the runaway condition of the CPU 4 should occur for some reasons, the clock pulses may not be normally fed out from the CPU 4. Therefore, the timer 5 is not reset before expiration of the predetermined period of time t and thus the reset signal is outputted from the timer 5. The CPU 4 is in turn reset in response to the reset signal fed from the timer 5.

Since the prior art electronic unit is constructed as described above, there is a problem such that if an erroneous stop signal is fed from the CPU 4 due the CPU's runaway, the operation of the timer 4 is stopped in response to such an erroneous stop signal. Therefore, the CPU 4 cannot be reset notwithstanding the fact that the CPU 4 is in a runaway condition.

SUMMARY OF THE INVENTION

The present invention has been made to eliminate the aforementioned problem, and it is an object of the invention to provide an electronic unit in which resetting of running CPU to render it to the initial condition is ensured. According to the present invention, there is provided an electronic unit operable in conjunction with a body unit comprising: a coupled/decoupled status signal generating means for generating a coupled-status signal when the electronic unit is coupled to the body unit and a decoupled-status signal when the electronic unit is decoupled from the body unit; a microcomputer coupled to the coupled/decoupled status signal generating means, the microcomputer being selectively placed to a start mode when the coupled-status signal is received from the coupled/decoupled status signal generating means and to a stop mode when the decoupled-status signal is received therefrom, the microcomputer producing clock pulses when placed in the start mode and a stop signal when placed in the stop mode; and a timer coupled to both the microcomputer and the coupled/decoupled status signal generating means, the timer outputting a reset signal to the microcomputer for resetting the microcomputer when the clock pulses fed from the microcomputer are interrupted for more than a predetermined period of time, and inhibitting the reset signal from being outputted from the timer when the stop signal is supplied, the timer being directly supplied with the decoupled status signal from the coupled/decoupled status signal generating means for controlling the output of the reset signal.

The electronic unit according to the present invention directly supplies the decoupled-status signal from an coupled/decoupled status signal generating means to a timer, to thereby stop the latter.

The timer according to the invention operates to inhibit the reset signal from being outputted when the decoupled-status signal is directly supplied from the coupled/decoupled status signal generating means to thus inhibit the microcomputer from being reset.

BRIEF DESCRIPTION OF THE DRAWINGS

The invention will be further described by way of non-limitative example with reference to the accompanying drawings, in which.

DESCRIPTION OF THE PREFERRED EMBODIMENTS

Figure 1:
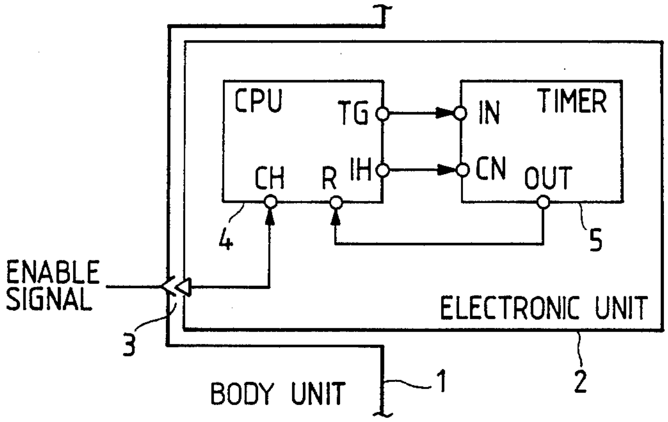
FIG. 1 PRIOR ART
FIG. 1 is a block diagram showing a conventional electronic unit.
Figure 2:
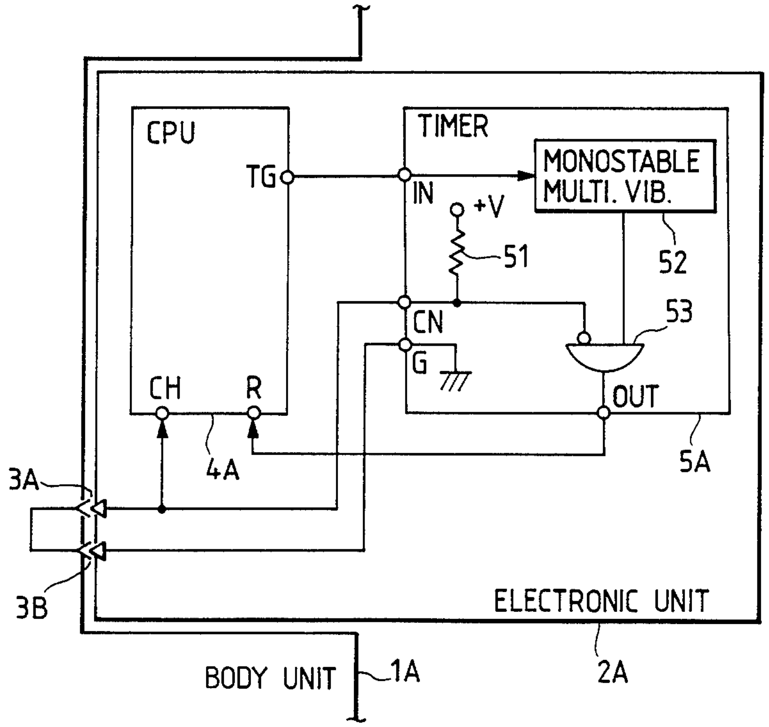
FIG. 2 is a block diagram showing an electronic unit according to one embodiment of the present invention.
Figure 3:
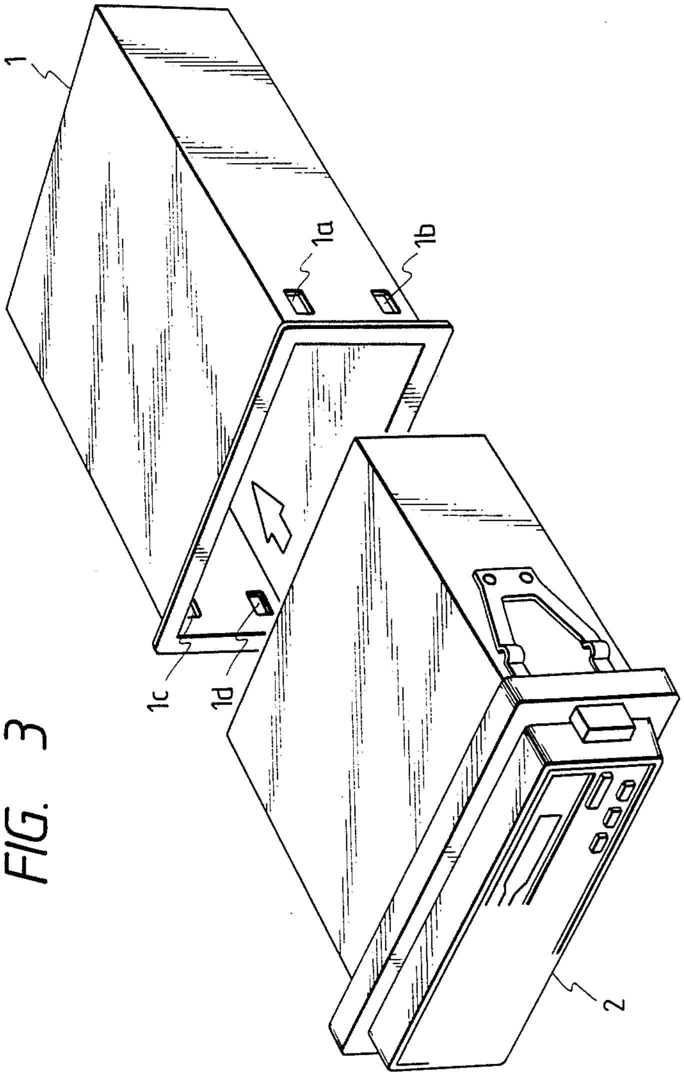
FIG. 3 is a schematic view illustrating coupling of a tape deck with a body unit.

Referring to FIG. 2, like FIG. 1, an electronic unit 2A is detachably coupled to a body unit 1A which is fixedly mounted on an automotive vehicle. The electronic unit 2A includes connectors 3A and 3B serving as a coupled/decoupled status signal generating means, a CPU 4 for controlling the electronic unit 2A, and a timer 5A. When the electronic circuit 2A is coupled to the body unit 1A, the connectors 3A and 3B are short-circuited and produce a coupled-status signal, whereas when the electronic circuit 2A is decoupled from the body unit 1A, the connectors 3A and 3B are isolated from each other and provide a decoupled-status signal. When the coupled-status signal is supplied to a terminal CH of the CPU 4A, the latter is placed in a start mode and feeds clock pulses to the timer 5A from a terminal TG, whereas when the decoupled-status signal is supplied to the terminal CH through the connector 3A, the CPU 4A is placed in a stop mode and the clock pulses are no longer fed from the terminal TG. The CPU 4A is reset to an initial condition in response to a reset signal supplied to its terminal R. When the clock pulses supplied to a terminal IN of the timer 5A are interrupted for more than a predetermined period of time, the reset signal for resetting the CPU 4A is produced from a terminal OUT. When the decoupled-status signal is supplied to the terminal CH from the connector 3A, issuance of the reset signal from the terminal OUT is interrupted.

The timer 5A includes a resistor 51 having a first terminal connected to a power supply (+V) and a second terminal connected to the connector 3A, a monostable multivibrator 52 supplied with the clock pulses from the CPU 4A, and a gate circuit 53 having an inverting input terminal connected to the second terminal of the resistor 51 and a non-inverting input terminal connected to the output of the monostable multivibrator 52. The output of the gate circuit 53 is connected to the terminal OUT. The connector 3B is grounded within the timer 5A through a terminal G of the timer 5A.

Although not illustrated in the drawing, in order to supply electric power to both the CPU 4A and the timer 5A when the CPU 4A is in the stop mode, a large quantity capacitor or a secondary battery is provided within the electronic unit 2A which is charged by an electric power from the body unit 1A.

The relationship between the given period T and the predetermined period of time t of the monostable multivibrator 52 is set as mentioned previously.

Next, operation will be described.

If a runaway condition of the CPU 4A occurs for some reasons, the clock pluses are not normally outputted from the terminal TG. The monostable multivibrator 52 of the timer 5A is therefore not reset even after the expiration of the predetermined period of time t and thus the output thereof is remained at a high level. At this time, if the electronic unit 2A has been coupled to the body unit 1A, a current flows in a path defined by the resistor 51, the terminal CN, the connectors 3A and 3B and the ground terminal G. Therefore, both inputs of the gate circuit 53 are raised to high level and the reset signal is fed out from the terminal OUT of the timer 5A and supplied to the terminal R of the CPU 4A. Accordingly, the CPU 4A is reset to an initial condition in response to the reset signal.

However, when the electronic unit 2A is decoupled from the body unit 1A, one input of the gate circuit 53 connected to the resistor 51 is at a low level and thus no reset signal is fed out from the terminal OUT of the timer 5A. At this time, the CPU 4A is being in the stop mode. Therefore, even if the clock pulses are not outputted from the CPU 4A, the latter is not reset in response to the reset signal.

In the above-described embodiment, it has been described that the coupled/decoupled status signal generating means which outputs the decoupled-status signal comprises the connectors 3A and 3B which are short-circuited when the electronic unit 2A is decoupled from the body unit 1A, and the timer 5A is such that the reset signal is not outputted upon closure of the gate circuit 53 when the decoupled-status signal is received. However, the coupled/decoupled status signal generating means may be implemented with a switch mechanism which is on-off controlled depending upon coupling to or decoupling from the electronic unit 2A. Further, an arrangement may be employed in which the reset signal is inhibited from being outputted in response to the enable signal fed from the body unit 1A shown in FIG. 1 so as to halt the operation of the timer 5A.

Moreover, although description has been made so that the timer 5A includes the monostable multivibrator 52, other equivalent circuits may be employed insofar as they provide the same effects as the monostable multivibrator.

As described, according to the present invention, when the clock pulses outputted from the CPU is interrupted for more than a predetermined period of time, a reset signal is produced for resetting the CPU. A timer is provided in which the reset signal is inhibited from being outputted in response to the decoupled-status signal of the coupled/decoupled status signal generating means, not fed through the CPU. Therefore, effects can be obtained such that the CPU can be reset to the initial condition when the same is in a runaway condition.

What is claimed is:

1. An electronic unit operable in conjunction with a body unit comprising:

a coupled/decoupled status signal generating means for generating a coupled-status signal when said electronic unit is coupled to said body unit and a decoupled-status signal when said electronic unit is decoupled from said body unit;

a microcomputer coupled to said coupled/decoupled status signal generating means, said microcomputer being selectively placed to a start mode when said coupled-status signal is received from said coupled-decoupled status signal generating means and to a stop mode when said decoupled-status signal is received therefrom, said microcomputer producing clock pulses when placed in said start mode and a stop signal when placed in said stop mode; and a timer coupled to both said microcomputer and said coupled/decoupled status signal generating means, said timer outputting a reset signal to said microcomputer for resetting said microcomputer when said clock pulses fed from said microcomputer are interrupted for more than a predetermined period of time, and inhibiting said reset signal from being outputted from said timer when said stop signal is supplied, said timer being directly supplied with said decoupled status signal from said coupled/decoupled status signal generating means for controlling the output of said reset signal.

2. An electronic unit according to claim 1, wherein said coupled/decoupled status signal generating means comprises:

first and second connectors, said second connector being connected to ground;

a power supply; and a resistor having a first terminal connected to said power supply and a second terminal connected to said first connector, said first and second connectors being short-circuited when said electronic unit is coupled to said said body unit.

3. An electronic unit according to claim 2, wherein said timer comprises a monostable multivibrator having an input connected to said microcomputer for receiving said clock pulses and an output, and a gate circuit having a first input connected to said output of said multivibrator, a second input connected to said coupled/-decoupled status signal generating means and an output connected to said microcomputer for outputting said reset signal thereto.

4. An electronic unit according to claim 1, wherein said body unit is fixedly mounted on an automotive vehicle.

* * * * *